United States Patent [19]

Meyer et al.

[11] Patent Number: 4,711,973
[45] Date of Patent: Dec. 8, 1987

[54] GAS INSULATED TRANSMISSION LINE WITH SIMPLIFIED INSULATOR ASSEMBLY AND METHOD OF ASSEMBLING SAME

[75] Inventors: Jeffry R. Meyer, Penn Hill Township, Allegheny County, Pa.; Albert P. Munroe, Southborough, Mass.; Philip C. Bolin, Wilkins, Pa.

[73] Assignee: Westinghouse Electric Corp., Pittsburgh, Pa.

[21] Appl. No.: 20,043

[22] Filed: Feb. 27, 1987

[51] Int. Cl.⁴ ............................................... H02G 5/06
[52] U.S. Cl. ..................................... 174/14 R; 29/828; 174/28; 174/99 B
[58] Field of Search ................. 174/14 R, 16 B, 21 C, 174/27, 28, 99 R, 99 B; 29/828

[56] References Cited

U.S. PATENT DOCUMENTS

Re. 31,949  7/1985  Hopkins ........................... 174/14 R

OTHER PUBLICATIONS

Westinghouse Descriptive Bulletin 33-650, Jun. 1982, "Type CGI Compressed Gas Insulated Bus", 8 pages.

*Primary Examiner*—Laramie E. Askin
*Attorney, Agent, or Firm*—G. H. Telfer

[57] ABSTRACT

An insulator for supporting the inner conductor of a gas insulated transmission line is configured so that its outer extremity is a simple blunt portion that fits loosely within a bearing block of insulating material of lower dielectric constant than the insulator itself so as to provide structural simplicity and improved performance through lessened breakdown susceptibility. A cylindrical particle trap ring formed of flexible metal sheet material is attached to the bearing block at locations spaced from the insulator.

8 Claims, 6 Drawing Figures

GAS INSULATED TRANSMISSION LINE WITH SIMPLIFIED INSULATOR ASSEMBLY AND METHOD OF ASSEMBLING SAME

BACKGROUND AND SUMMARY OF THE INVENTION

This invention relates to the transmissin lines having an inner conductor concentrically within an outer sheath with a gaseous insulation medium therebetween and particularly to arrangements in which solid insulators support the inner conductor in relation to the outer sheath and also support a particle trap in relation to the outer sheath.

General practice is for the inner conductor of a gas insulated transmission line to have support insulators at axially spaced locations. A typical support insulator is cast circumferentially around the inner conductor, or a metal sleeve into which the conductor is inserted, and has three uniformly spaced posts or legs, referred to as a tri-post arrangement, extending toward the outer sheath. One insulator, usually at an end of the conductor, is rigidly attached to the outer sheath. The outer ends of the posts of others of the insulators are preferably not rigidly attached to the outer sheath in order to permit relative axial movement between the inner conductor and outer sheath due to thermal effects. Also required is a particle trap in the area where there is contact between the insulator assembly and the outer sheath.

These various requirements have been met by prior art such as U.S. Pat. No. Re. 31,949, July 16, 1985, (original Pat. No. 4,335,267, June 15, 1982) by M. D. Hopkins, where an arrangement is shown and described in which wheel assemblies are located within support insulator openings in the lower two of the three insulator legs for facilitating axial movement. In a third leg is an insulating contact button cover allowing insertion of the conductor with low abrasion. When inserted, the button cover is removed for making electrical contact between a particle trap ring and the outer sheath. The structure requires cast-in metal inserts in the insulator legs which are undesirable as they complicate the structure and increase its expense. An earlier arrangement used polytetrafluoroethylene pads at the ends of the insulator legs. The pads were highly machined to provide a curved outer surface for sliding against the sheath and had an inner recess for fitting over a bolt in the insulator. This arrangement was not as successful as that of the mentioned patent. In general, the former structures such as that of the mentioned patent require several components which it would be desirable to reduce in number, cost and complexity. In addition, it is desirable to have an arrangement that may be readily assembled with relatively loose tolerances while ensuring reliable performance. Other aspects of gas transmission lines where simplicity and economy are achieved are described in copending application Ser. No. 938,910 filed Dec. 8, 1986 by Meyer et al. and assigned to the present assignee.

Briefly, in accordance with the present invention, a solid insulator is firmly attached to the inner conductor by being cast onto it (or a sleeve), as formerly, but the arrangement for associating the insulator to the outer sheath is simplified by requiring no cast-in metal inserts with their inherent risk of becoming loose or of causing insulator cracking due to overload. Instead, the insulator, which may be a tri-post or some other geometrical configuration, and an insulating bearing block are simply fit together. For example, the insulator may be provided with a simple blunt extremity that fits within an aperture of the insulating bearing block, preferably merely in a loose fit. The bearing block requires no special shaping so as to conform to the cylindrical sheath, although such shaping may be employed if desired. The block preferably is of a relatively low friction, abrasion resistant material such as high molecular weight polyethylene. Such a bearing block is suitably used on each leg or post of the insulator.

Additionally, the bearing block has a low dielectric constant compared to that of the support insulator. A particle trap ring is arranged so any particles produced during the assembly of the inner conductor and insulators within the outer sheath are confined in the trap. The particle trap ring and the sheath are connected electrically by a spring arm, extending out from the particle trap, that has a contact element on its end that runs against the outer sheath. The bearing block itself supports the particle trap and requires no additional components other than fasteners such as pop rivets for securing them together.

What is further advantageous is that the attachment of the particle trap to the bearing block can be at a location that is spaced from the support insulator because the bearing block may be extended axially sufficiently for that purpose. This means the bearing block eases the transition between the higher dielectric constant support insulator and the conductive particle trap and outer sheath so the arrangement is not prone to cause electrical breakdown even with loose tolerances.

It is therefore believed that the present invention has satisfactory or better performance characteristics in relation to previous structures while yielding considerable savings in parts cost and assembly time.

DESCRIPTION OF THE PREFERRED EMBODIMENTS

Figure 1:
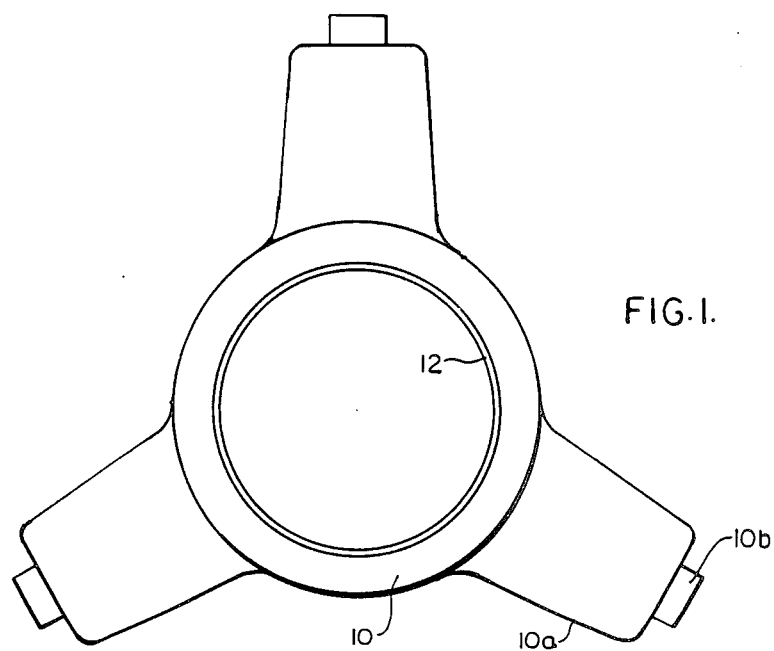
FIG. 1 is an elevation view of an example of an insulator for use in the present invention.

FIG. 1 shows a gas insulated transmission line support insulator 10 that has been formed by casting onto a conductive sleeve 12 and having a tri-post configuration. The insulator 10 may also be cast directly onto a central conductor for a transmission line. Other geometries for the insulator 10 may also be used, such as a disk configuration. Each post or leg 10a has an end or extremity 10b with no cast inserts of metal and with no concavity or other features requiring close tolerances or special shaping. Instead, the extremities 10b are are each blunt with generally flat outer surfaces and are, in this example, circular discs integrally formed with the rest of insulator 10.

In the assembly views of FIGS. 2–4, it is seen that the extremity 10b of each leg 10a fits within a central opening 14a of a respective bearing block 20, to be further described hereinafter. The extremity 10b and opening 14a require only a loose fit.

The insulator 10 may be made of cast resinous material as has been used before for support insulators. Merely as an example, the support insulator 10 may consist of an epoxy resin containing silica filler in a quantity of about 70% by weight. The insulator 10 typically has a dielectric constant of about 4 to 5. It will be apparent that other insulator compositions may be selected consistent with the teachings of the present invention.

Figure 4:
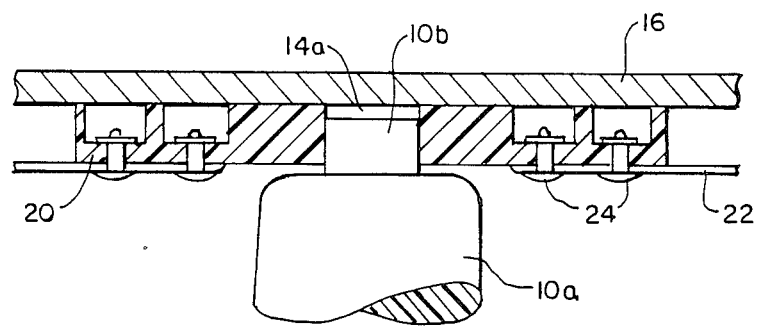
FIGS. 3 and 4 are partial views of the apparatus of FIG. 2 with FIG. 4 taken along line IV—IV of FIG. 3.
Figure 2:
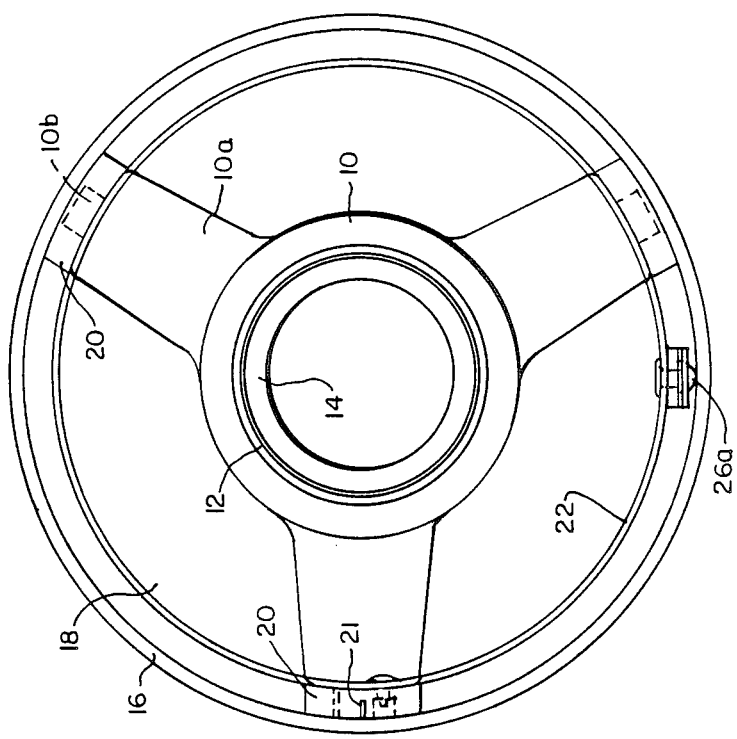
FIG. 2 is a sectional view in a radial plane of an assembled structure in accordance with the invention with certain elements broken away.
Figure 3:
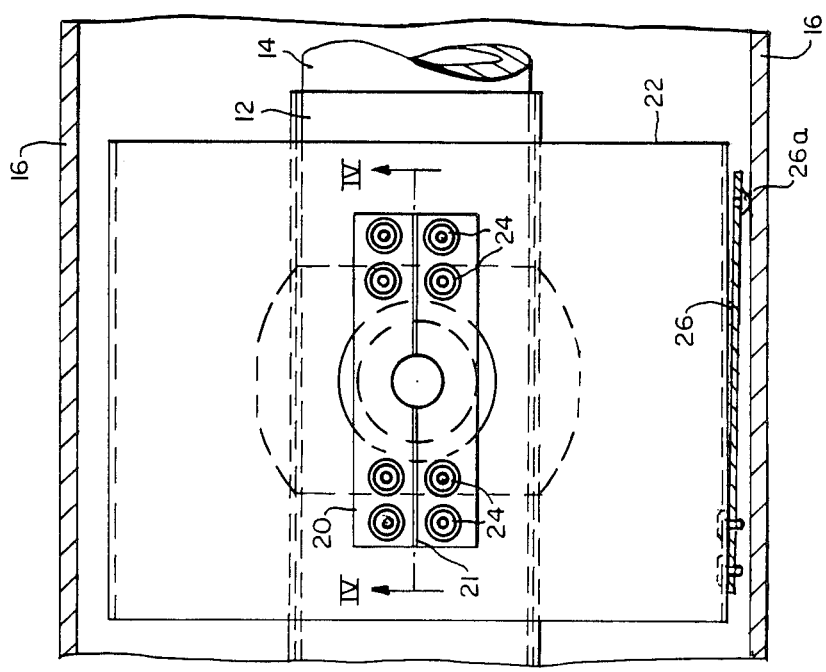

The assembly views of FIGS. 2-4 show a central conductor 14 running through insulator 10 and an outer metal sheath 16 enclosing a gas filled space 18. The support insulator 10 is to insulatively support the conductor 14 while also allowing an easy assembly by sliding the conductor 14 within the outer sheath 16 along with a particle trap 22.

Each bearing block 20 may have a simple, straight-sided, configuration. That is, its exact configuration is relatively non-critical. It is preferable, however, for the block 20 to be cured somewhat to conform to the curvature of the shield 16, as shown in FIG. 2. A saw cut 21 partly through the block 20 in the longitudinal direction gives the block a degree of flexibility helping it to conform to the shield.

In this example, the bearing block 20 comprises an insulating material and particularly a molded plastic material such as UHMW (ultrahigh molecular weight) polyethylene. Other materials that may be used include nylon and Teflon or polytetrafluoroethylene but the UHMW polyethylene is preferred for a better combination of low friction and abrasion-resistant characteristics.

The block 20 has a low dielectric constant in relation to that of the insulator 10. Epoxy resin insulators as made for such transmission systems are of epoxy resin material having a dielectric constant of about 4 or 5. The bearing block 20 of a composition such as UHMW polyethylene has a dielectric constant of about 3. The significance is that the region where the insulator 10, the block 20 and the insulating gas 18 meet (sometimes referred to as "the triple point" at which an electrical breakdown is most likely to be initiated) is not as susceptible to breakdown as if the insulator 10 had an interface directly with any metallic component, such as a cast-in insert. In other terms, there is by this structure a more gradual electrical transition from the relatively high dielectric constant insulator 10 to the lower dielectric constant block 20 and then to the metal particle trap 22 and sheath 16 than has been previously provided by prior art such as the above-referenced patent.

It is sufficient that the bearing block 20 be only a few inches in the longitudinal direction longer than the longitudinal extent of the insulator 10. This provides a location for attachment of the particle trap 22 that is remote, by a few inches, from the insulator 10 and provides this improvement in lessened breakdown susceptibility. Fasteners 24, such as pop rivets, serve to secure the trap 22 to block 20.

The requirement for the particle trap 22 and the outer sheath 16 to be electrically joined is simply met by having a bar spring 26 riveted to the trap 22 and a contact 26a of a suitable contact material pressed into an aperture in the spring for contact against the inner surface of sheath 16. The bar spring may be riveted to the trap anywhere in its circumference, either at a bearing block or remote from it and need only occur at one location. For an insulator 10 in a fixed location, a bar may be fit against the outer enclosure and welded.

In assembly, the following simple procedures may be carried out:
  (a) a central conductor 14 is joined with a number of support insulators 10, configured as shown in the example, spaced along its length;
  (b) a flexible metal sheet material, with openings for accommodating insulator ends 10b, is wrapped to form a cylindrical particle trap 22;
  (c) each extremity 10b of a support insulator is fit into a bearing block 20;
  (d) the particle trap 22 is riveted to one or more of the bearing blocks 20 (e.g., the two ends of a metal sheet forming a particle trap 22 may be riveted to a single block 20);
  (e) a spring bar 26 is riveted to each particle trap on an insulator that is intended to allow axial movement of the inner conductor;
  (f) the assembled inner conductor 14 with insulators 10, particle traps 22, and bearing blocks 20 is slid into an outer metal sheath 16 with the bearing blocks making the only contact with the sheath.

It is therefore seen that in accordance with the present invention the structural arrangement at the outer ends of the insulator is much simplified over those that require cast-in metal pieces or other shaped metal pieces and in doing so there is a distinct improvement in performance by lessening the susceptibility of the structure to an electrical breakdown. This aspect of the invention has been verified by electrical tests on an insulator configured to fit within a bearing block as disclosed here to confirm the lack of breakdown susceptibility.

It will be apparent that the invention may take other forms in accordance with the general teachings herein.

Figure 5:
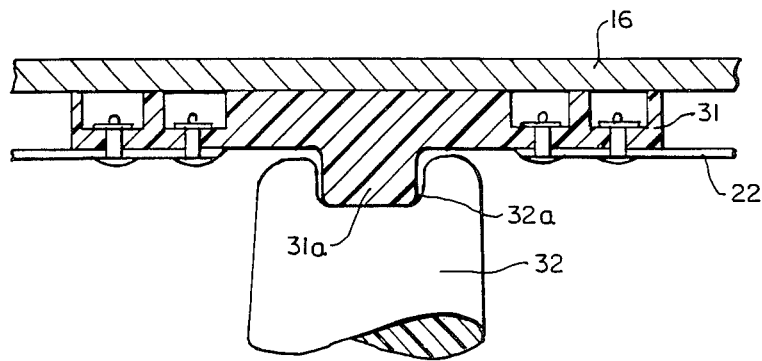
FIGS. 5 and 6 are partial views illustrating some alternative arrangements with which the invention may be practiced.
Figure 6:
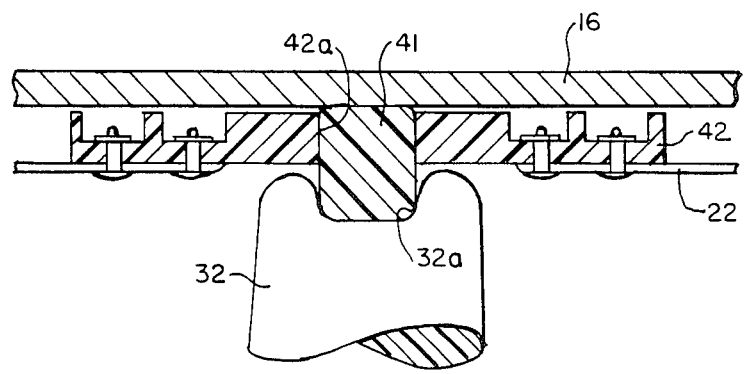

Among the other ways that the invention may be practiced is for one of the alternative arrangements generally illustrated in FIGS. 5 and 6 to be used. FIG. 5 is basically the inverse of FIG. 4. That is, bearing block 31 has a projection 31a fitting into a recessor cavity 32a of insulator post 32.

In FIG. 6 an insulator post 32 with a recess or cavity 32a is also shown. Here the bearing element 41 is merely a peg or the like that secures a plate 42 of low dielectric constant material to which the particle trap 20 is secured (in the manner of FIGS. 3 and 4, for example). Plate 42 is provided with an aperture 42a to accommodate the peg 41. The bearing element 41 may be of ultrahigh molecular weight polyethylene while the plate 42 is of a cheaper plastic, still of low dielectric constant, to reduce cost. In effect, therefore, the embodiment of FIG. 6 forms a bearing block analogous to block 31 of FIG. 5 with the bearing element 41 and the plate 42 taken together.

We claim:
1. A gas insulated transmission line comprising:
  a cylindrical outer sheath;
  an inner conductor disposed within said outer sheath;
  an insulating gas electrically insulating said inner conductor from said outer sheath;
  support means for insulatably supporting said inner conductor within said outer sheath, said support means comprising a solid insulator having an inner portion attached to said inner conductor and an outer portion;
  a bearing block of insulating material fitting together with said outer portion of said solid insulator and having a lower dielectric constant than said insulator, said bearing block having a sliding relation with said outer sheath; and, a metal particle trap circumferentially disposed coaxially with said outer sheath and attached to said block at locations removed from said insulator.

2. A gas insulated transmission line in accordance with claim 1 wherein:

said bearing block has a central aperture within which an extremity of said insulator outer portion is disposed.

3. A gas insulated transmission line in accordance with claim 2 wherein:

said extremity of said insulator outer portion is loosely fit within said central aperture of said bearing block.

4. A gas insulated transmission line in accordance with claim 1 wherein:

said insulator is of a cast resinous composition having a dielectric constant of about four or more and said bearing block has a dielectric constant of about three or less.

5. A gas insulated transmission line in accordance with claim 1 wherein:

a metal spring arm is attached to said particle trap and has an extremity with an electrical contact button thereon that bears against said outer sheath.

6. A gas insulated transmission line in accordance with claim 1 wherein:

said bearing block has a central projection fitting within a recess of said insulator outer portion.

7. A gas insulated transmission line in accordance with claim 1 wherein:

said bearing block has a first, central, portion of a first insulative material fitting within a recess of said insulator outer portion that bears against said outer sheath and a second portion of a second insulative material having a central aperture through which said first portion extends; and said particle trap is secured to said second portion of said bearing block.

8. A method of assembling a gas insulated transmission line comprising the steps of:

providing a central conductor with at least one support insulator, extending radially therefrom;

forming a cylindrical particle trap by wrapping a flexible metal sheet material;

fitting a bearing block of insulating material onto an extremity of said support insulator without use of metal hardware;

fastening said particle trap to said bearing block at points spaced from said support insulator;

fastening an electrical contact to said particle trap; and sliding said inner conductor supported on said support insulator and bearing block into an outer metal sheath.

* * * * *